US012097986B2

(12) United States Patent
Li et al.

(10) Patent No.: US 12,097,986 B2
(45) Date of Patent: Sep. 24, 2024

(54) SEALING DEVICE AND MULTIFUNCTIONAL VACUUM SEALING MACHINE APPLYING SAME

(71) Applicant: SHENZHEN DESIWIN PRODUCT DEVELOPMENT CO., LTD., Guangdong (CN)

(72) Inventors: Cheng Li, Guangdong (CN); Guoliang Huang, Guangdong (CN); Zhenming Wang, Guangdong (CN)

( * ) Notice: Subject to any disclaimer, the term of this patent is extended or adjusted under 35 U.S.C. 154(b) by 95 days.

(21) Appl. No.: 17/636,871

(22) PCT Filed: Sep. 16, 2019

(86) PCT No.: PCT/CN2019/105894
§ 371 (c)(1),
(2) Date: Feb. 19, 2022

(87) PCT Pub. No.: WO2021/051223
PCT Pub. Date: Mar. 25, 2021

(65) Prior Publication Data
US 2022/0340321 A1    Oct. 27, 2022

(51) Int. Cl.
*B65B 51/14*    (2006.01)
*B65B 31/06*    (2006.01)
*B65B 61/10*    (2006.01)

(52) U.S. Cl.
CPC ............ *B65B 51/148* (2013.01); *B65B 31/06* (2013.01); *B65B 51/146* (2013.01); *B65B 61/10* (2013.01)

(58) Field of Classification Search
CPC ....... B65B 31/06; B65B 31/08; B65B 51/146; B65B 51/148; B65B 61/10;
(Continued)

(56) References Cited

U.S. PATENT DOCUMENTS 7,377,087 B2 *   5/2008   Clarke .................... B65B 31/08
                                                             53/469
7,805,913 B2 *  10/2010   Alipour ................. B29C 66/229
                                                             53/434
(Continued)

FOREIGN PATENT DOCUMENTS

KR         100968618      *   7/2010
KR        20110054571     *   5/2011
WO     WO-2011111924 A2   *   9/2011    ............. B65B 31/08

*Primary Examiner* — Stephen F. Gerrity
*Assistant Examiner* — Linda J Hodge

(57) ABSTRACT

A multifunctional vacuum sealing machine which includes a shell, and a vacuumizing device and a sealing device which are arranged in the shell, wherein the sealing device includes a hot welding device; cross sealing can be performed at a connector position twice, thus forming a completely-closed sealing line; and during vacuumizing, while a bag to be vacuumized is clamped and sealed by an upper cavity and a lower cavity, the bag is punched by a cutter head in the upper cavity, the bag is vacuumized, a punching position is in a closed area surrounded by one sealing line with the adjacent first heating wires and the second heating wire or in a closed area surrounded by the first heating wires and the second heating wires, and after vacuumizing, an opening is sealed at an original position, so that it is guaranteed that air cannot enter the vacuumized bag during sealing.

8 Claims, 5 Drawing Sheets

(58) Field of Classification Search
CPC ............ B29C 66/8161; B29C 66/8491; B29C 66/861; B29C 66/242243–242245
USPC .............................. 53/434, 489, 284.7, 512
See application file for complete search history.

(56) References Cited

U.S. PATENT DOCUMENTS

| | | | |
|---|---|---|---|
| 2004/0000502 A1* | 1/2004 | Shah | B65D 33/01 |
| | | | 206/524.8 |
| 2006/0231211 A1* | 10/2006 | Chou | B29C 66/8618 |
| | | | 156/583.1 |
| 2008/0028730 A1* | 2/2008 | Savicki | F01C 13/00 |
| | | | 53/85 |
| 2009/0020230 A1* | 1/2009 | Chang | B29C 66/8416 |
| | | | 156/579 |
| 2009/0026401 A1* | 1/2009 | Dobkins | B65D 81/2038 |
| | | | 251/149.6 |
| 2016/0229115 A1* | 8/2016 | Chang | B29C 66/1122 |

* cited by examiner

SEALING DEVICE AND MULTIFUNCTIONAL VACUUM SEALING MACHINE APPLYING SAME

TECHNICAL FIELD

The utility model relates to the field of packaging, and more particularly, to a sealing device and a multifunctional vacuum sealing machine applying the same.

BACKGROUND ART

An existing sealer usually seals a product after vacuumization, so that air will enter the product during sealing, thus having a poor sealing effect; and in addition, the existing sealer has a single function, which means that the existing sealer can only be used for vacuumization and sealing, but cannot be used for vacuumizing those sealed bags.

SUMMARY

The utility model aims to solve a problem of poor sealing effect of an existing sealer.

The technical solution used to solve the technical problem proposed by the utility model is as follows: a sealing device of the utility model comprises a hot welding device and a pressing plate matched with the hot welding device for press welding, the hot welding device comprising a heating wire, wherein the heating wire comprises more than two first heating wires arranged in parallel and more than one second heating wire connected with the adjacent first heating wires.

A multifunctional vacuum sealing machine applying the sealing device of the utility model comprises a shell, and a vacuumizing device and the sealing device which are arranged in the shell, wherein the vacuumizing device comprises a lower cavity arranged in the shell and an upper cavity movably connected with the lower cavity up and down, a sealed cavity is formed when the upper cavity and the lower cavity are pressed, the sealed cavity is connected with a vacuum pump, the heating wire is located in the lower cavity, the pressing plate is arranged in the upper cavity, the pressing plate is movably connected with the upper cavity up and down, and a pressing surface of the pressing plate is lower than a bottom surface of the upper cavity; and the shell is also internally provided with an upper cavity reset spring for resetting the upper cavity and a pressing plate reset member for separating the pressing plate from the heating wire, the upper cavity is internally and fixedly provided with a needle for punching, and the needle corresponds to a position above an area surrounded by the adjacent first heating wires and the second heating wire.

The technical solution used for further limiting the utility model is as follows.

The shell is internally provided with a battery compartment and a vacuum pump compartment, the battery compartment is internally provided with a power supply battery, and the vacuum pump is arranged in the vacuum pump compartment.

The shell comprises an upper cover and a lower cover matched with the upper cover, the lower cavity is arranged in the lower cover, the upper cover is internally and fixedly provided with an upper cover bracket, the upper cavity is arranged in the upper cover bracket and slidably connected with the upper cover bracket up and down, a button is arranged above the upper cover bracket correspondingly, the button is fixedly connected with the upper cavity through a sleeve arranged in the upper cavity, the upper cavity reset spring is located on the upper cover bracket and sheathed outside the sleeve, and a top end of the upper cavity reset spring is fixedly connected with the button; and the pressing plate is connected with the upper cavity through a pressing plate telescopic spring, one end of the pressing plate telescopic spring is fixedly connected with the upper cavity, the other end of the pressing plate telescopic spring is fixedly connected with the pressing plate, and the pressing plate and the pressing plate telescopic spring are both located in the sleeve.

A wall of the lower cavity is internally provided with a first air pumping hole communicated with the lower cavity, the lower cover is provided with an air pumping connection hole hermetically communicated with the first air pumping hole, and the air pumping connection hole is connected with the vacuum pump.

The lower cavity is detachably connected with the lower cover, the lower cavity has a symmetrical structure, the lower cavity is capable of rotating by 180 degrees to be connected with the lower cover, a bottom portion of the lower cover is provided with an air pumping connector corresponding to a position below the first cavity, the wall of the lower cavity is internally provided with a second air pumping hole communicated with the air pumping connector corresponding to the first air pumping hole, and when the lower cavity rotates by 180 degrees, the second air pumping hole is hermetically communicated with the air pumping connection hole.

The upper cover is provided with a cutting device, the cutting device comprises a cutter head slidably clamped with the upper cover up and down, a tail portion of the cutter head is fixedly provided with a first inclined slider, the upper cover is provided with a toggle switch for pushing the cutter head to extend downwardly, the toggle switch is provided with a second inclined slider matched with the first inclined slider, and a cutter head reset spring for driving the cutter head to retract and reset is arranged between the first inclined slider and the upper cover; and the toggle switch is slidably arranged on the upper cover, and a top portion of the upper cover is provided with a toggle switch guide groove for guiding the toggle switch.

The upper cover bracket at a bottom portion of the button is provided with an elastic sheet for switching on a power supply of the vacuum pump, and when the button is pressed, the power supply of the vacuum pump is switched on to start operation.

The upper cover is rotatably connected with the lower cover, the button is slidably connected with the upper cover up and down, an outer wall of the button is provided with a first button outer edge, and the upper cover is provided with an upper cover button pressing block for pushing the button to move downwardly; and the pressing plate reset member is a pressing plate reset elastic sheet arranged between the upper cover and the lower cover.

The upper cover is fixedly connected with the lower cover, the upper cover is provided with a rotating plate rotatably connected with the upper cover corresponding to a position above the upper cover bracket, the button is slidably connected with the rotating plate up and down, an outer wall of the button is provided with a second button outer edge, the rotating plate is provided with a rotating plate button pressing block for pushing the button to move downwardly, and the upper cavity reset spring is also the pressing plate reset member at the same time.

Through the technical solutions above, the utility model has the beneficial effects that: the multifunctional vacuum sealing machine of the utility model seals a product through the sealing device first, and since the hot welding device comprises more than two first heating wires arranged in parallel and more than one second heating wire connected with the adjacent first heating wires, cross sealing can be performed twice during sealing, thus forming a completely-closed sealing line; and during vacuumizing, while a bag to be vacuumized is clamped and sealed by the upper cavity and the lower cavity, the bag is punched by the cutter head in the upper cavity, the bag is vacuumized, a punching position is in a closed area surrounded by one sealing line with the adjacent first heating wires and the second heating wire or in a closed area surrounded by the first heating wires and the second heating wires, and after finishing vacuumizing, an opening is sealed at an original position, so that it is guaranteed that air cannot enter the vacuumized bag during sealing, thus having a good sealing effect.

DETAILED DESCRIPTION OF THE EMBODIMENTS

The structure of the utility model is further described hereinafter with reference to the drawings.

Figure 1:
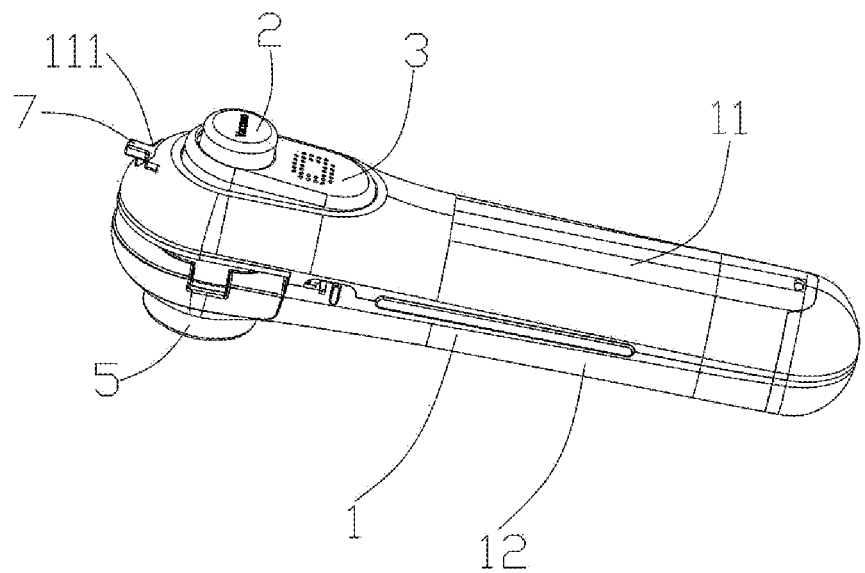
FIG. 1 is a schematic structural diagram of a multifunctional vacuum sealing machine in Embodiment 2 of the utility model.
Figure 2:
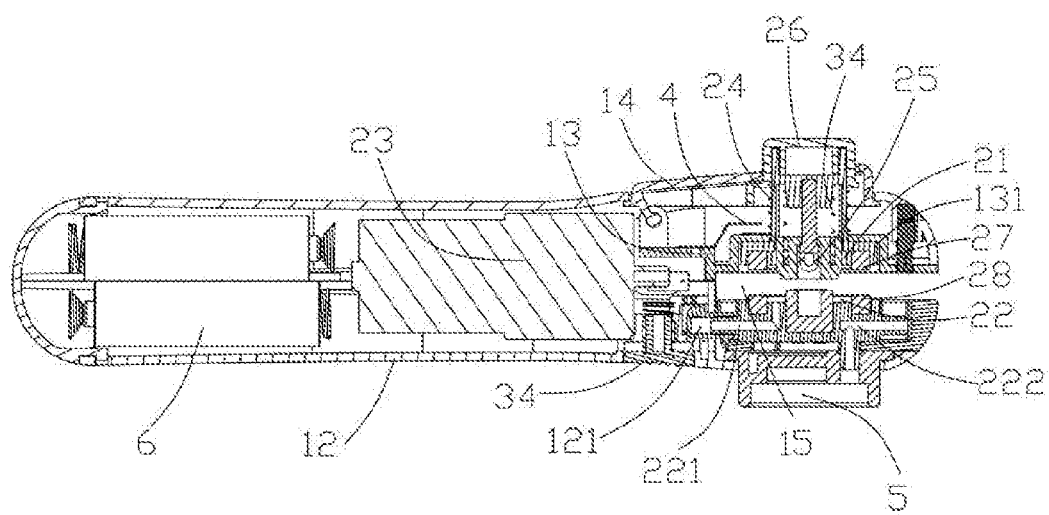
FIG. 2 is a schematic structural diagram of sectioning of the multifunctional vacuum sealing machine in Embodiment 2 of the utility model.
Figure 3:
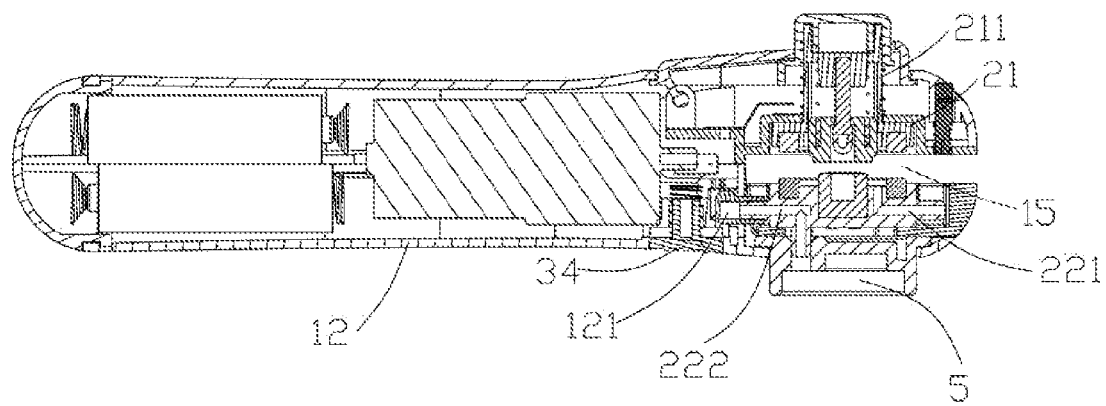
FIG. 3 is a schematic structural diagram of sectioning of a lower cavity rotating by 180 degrees of the multifunctional vacuum sealing machine in Embodiment 2 of the utility model.
Figure 4:
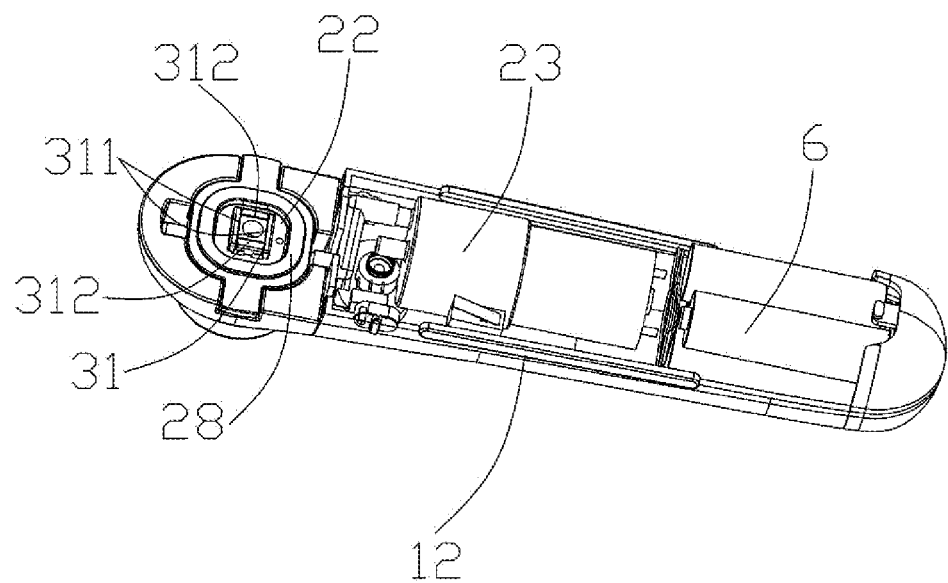
FIG. 4 is a schematic structural diagram of assembly of a lower cover of the multifunctional vacuum sealing machine in Embodiment 2 of the utility model.
Figure 5:
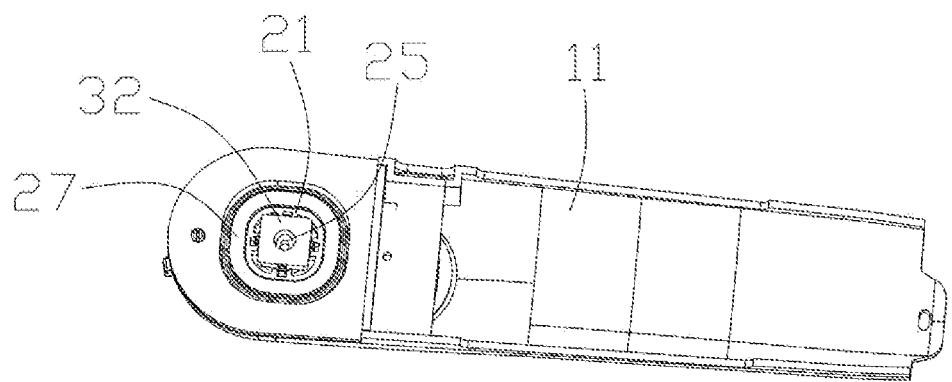
FIG. 5 is a schematic structural diagram of assembly of an upper cover of the multifunctional vacuum sealing machine in Embodiment 2 of the utility model.
Figure 6:
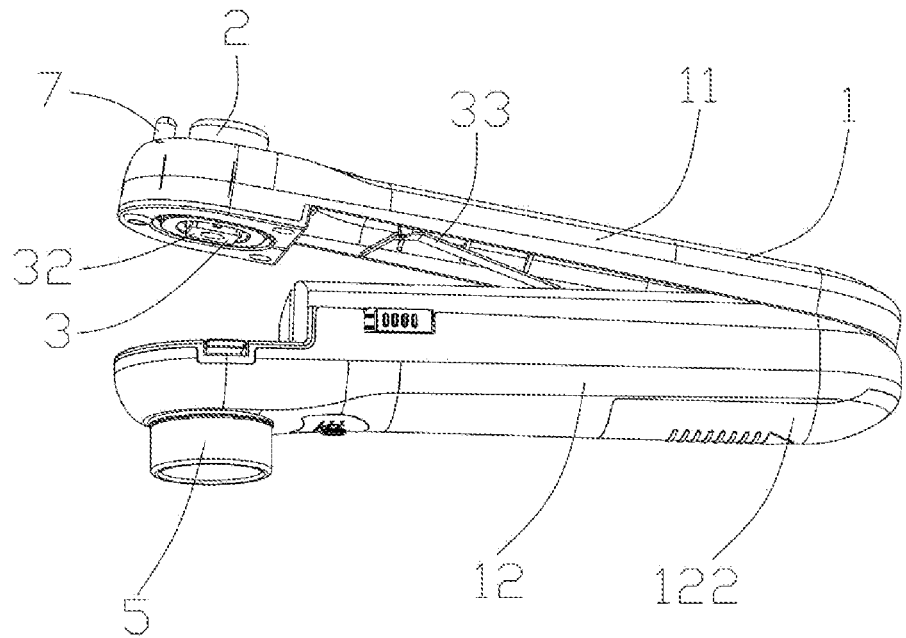
FIG. 6 is a schematic structural diagram of a multifunctional vacuum sealing machine in Embodiment 1 of the utility model when an upper cover and a lower cover are opened.
Figure 7:
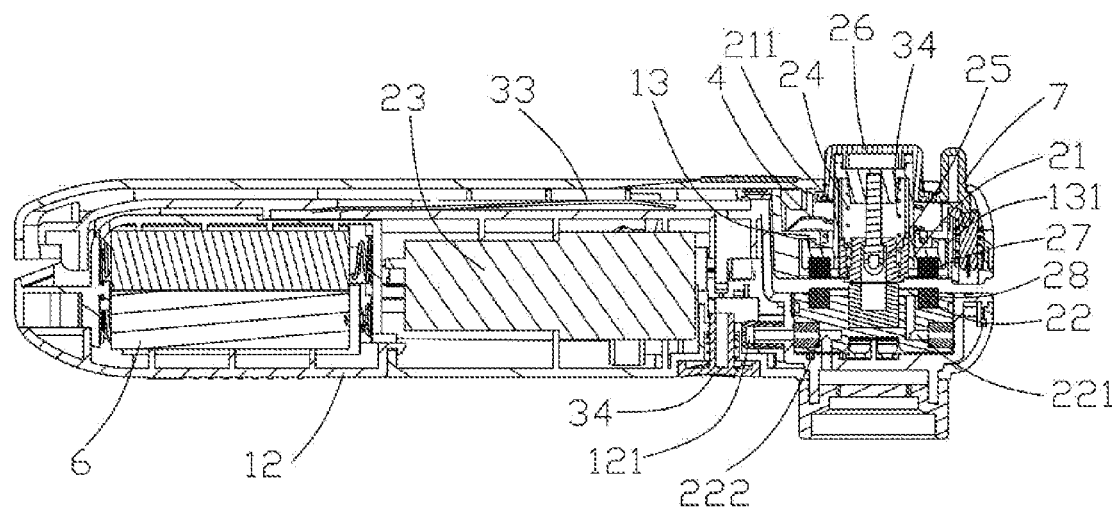
FIG. 7 is a schematic structural diagram of sectioning of the multifunctional vacuum sealing machine in Embodiment 1 of the utility model.
Figure 8:
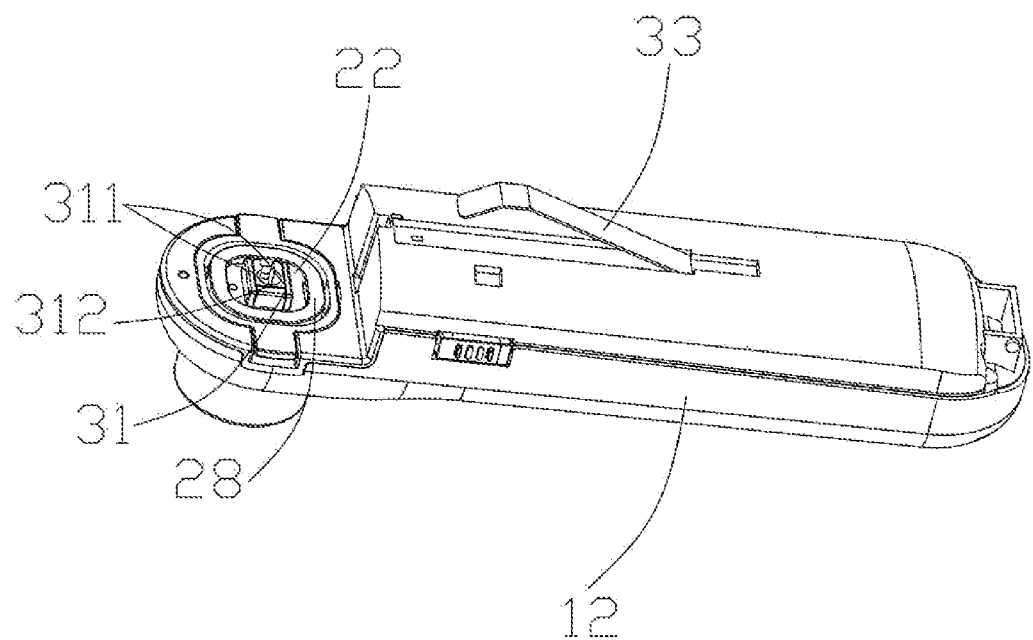
FIG. 8 is a schematic structural diagram of assembly of the lower cover of the multifunctional vacuum sealing machine in Embodiment 1 of the utility model.
Figure 9:
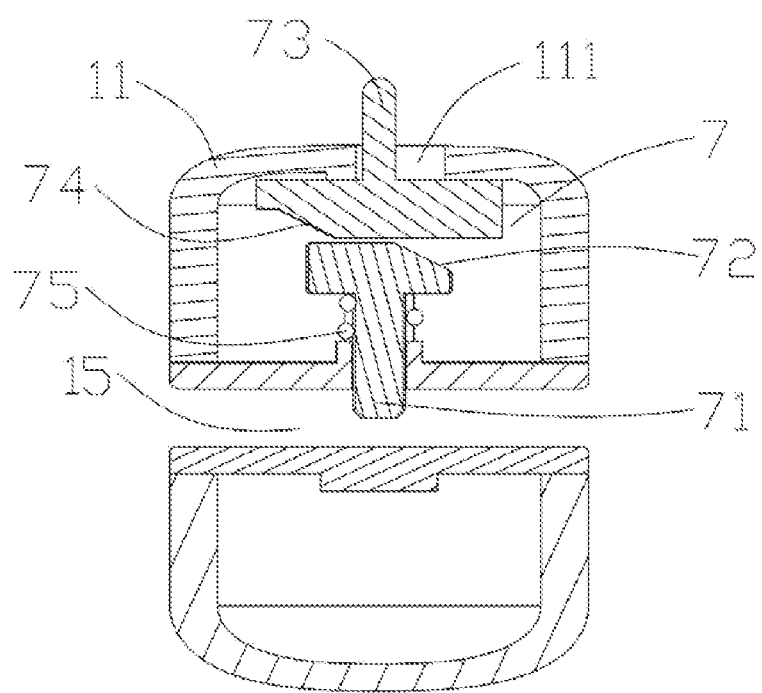
FIG. 9 is a schematic structural diagram of a cutting device of the multifunctional vacuum sealing machine of the utility model.

With reference to FIG. 1 to FIG. 9, a sealing device 3 of the utility model comprises a hot welding device 31, and a pressing plate 32 matched with the hot welding device for press welding, and the hot welding device comprises a heating wire. The heating wire comprises more than two first heating wires 311 arranged in parallel and more than one second heating wire 312 connected with the adjacent first heating wires. In Embodiment 1, two first heating wires are provided, and the two parallel first heating wires and the second heating wire form a U-shaped structure. In Embodiment 2, two first heating wires are provided, two second heating wires are provided, and the first heating wires and the second heating wires form a sealed structure in a square shape. Therefore, during sealing, when one side is sealed and then the other side is sealed, even if sealing lines at two sides are not completely aligned, cross sealing can be performed twice due to existence of the second heating wire, thus forming a completely-closed sealing line. During specific implementation, more than two first heating wires arranged in parallel and more than one second heating wire connected with the adjacent first heating wires may be provided according to requirements.

A multifunctional vacuum sealing machine applying the sealing device of the utility model comprises a shell 1, and a vacuumizing device 2 and the sealing device 3 which are arranged in the shell. The shell 1 is provided with an opening 15 for a bag to be inserted. The vacuumizing device 2 comprises a lower cavity body 22 arranged in the shell and an upper cavity body 21 movably connected with the lower cavity body up and down. A sealed cavity is formed when the upper cavity body and the lower cavity body are pressed, the sealed cavity is connected with a vacuum pump 23, the heating wire is located in the lower cavity body, the pressing plate is arranged in the upper cavity body, the pressing plate is movably connected with the upper cavity body up and down, and a pressing surface of the pressing plate is lower than a bottom surface of the upper cavity body. The shell is also internally provided with an upper cavity body reset spring 24 for resetting the upper cavity body and a pressing plate reset member 33 for separating the pressing plate from the heating wire, the upper cavity body is internally and fixedly provided with a needle 25 for punching, and the needle corresponds to a position above an area surrounded by the adjacent first heating wires and the second heating wire. During vacuumizing, the upper cavity body moves downwardly, while a bag to be vacuumized is clamped and sealed by the upper cavity body and the lower cavity body, the bag is punched by a cutter head in the upper cavity body, the bag is vacuumized, a punching position is in a semi-closed area surrounded by one sealing line with the adjacent first heating wires and the second heating wire or in a closed area surrounded by the first heating wires and the second heating wires, and after finishing vacuumizing, an opening is sealed at an original position, so that it is guaranteed that air cannot enter the vacuumized bag during sealing, thus having a good sealing effect.

The shell 1 comprises an upper cover 11 and a lower cover 12 matched with the upper cover, the lower cavity body is arranged in the lower cover, the upper cover is internally and fixedly provided with an upper cover bracket 13, and the upper cavity body is arranged in the upper cover bracket and slidably connected with the upper cover bracket up and down. A button 26 is arranged above the upper cover bracket correspondingly, the upper cavity body 11 is fixedly connected with a sleeve 211 communicated with the upper cavity body 11, the button is fixedly connected with the upper cavity body through the sleeve 211, the upper cavity body reset spring 24 is located on the upper cover bracket 13 and sheathed outside the sleeve 211, and a top end of the upper cavity body reset spring is fixedly connected with the button. The pressing plate and a pressing plate telescopic spring 34 are located in the sleeve 211, one end of the pressing plate telescopic spring is fixedly connected with the upper cavity body, the other end of the pressing plate telescopic spring is fixedly connected with the pressing plate. In the embodiment, the upper cover bracket 13 is provided with a limiting groove 131 for limiting reset displacement of the upper cavity body, and the limiting groove is used for limiting the reset displacement of the upper cavity body. When the button is pressed, the button drives the lower cavity body to move downwardly, the lower cavity body drives the needle to move downwardly, and the upper cavity body and the lower cavity body punch the bag while pressing and sealing the bag. At the moment, the bag is also pressed by the pressing plate and the heating wire, the upper cavity body reset spring is compressed, and the pressing plate telescopic spring is compressed. After finishing vacuumizing, the opening is sealed at the original position. When the button is released, the upper cavity body reset spring rebounds to separate the upper cavity body from the lower cavity body, and the limiting groove is used for limiting the reset displacement of the upper cavity body. The pressing plate telescopic spring rebounds, and the bag is released by the pressing plate and the heating wire.

In Embodiment 1, the upper cover 11 is rotatably connected with the lower cover 12, and the button 26 is slidably connected with the upper cover up and down. The upper cover is provided with a first button opening matched with the button, and the button is slidably arranged in the first button opening up and down. An outer wall of the button 26 is provided with a first button outer edge 261, and the upper cover 11 is provided with an upper cover button pressing block for pushing the button to move downwardly. The pressing plate reset member 33 is a pressing plate reset elastic sheet arranged between the upper cover and the lower cover. In Embodiment 1, the two parallel first heating wires and the second heating wire form a U-shaped structure. When the upper cover is pressed, the upper cover rotates and moves downwardly, and the upper cover button pressing block presses the first button outer edge to move downwardly, thus driving the pressing plate to move downwardly together. The pressing plate is contacted with the heating wire first, and the pressing plate reset elastic sheet is compressed. At the moment, a power supply of the heating wire is switched on, so that the bag may be sealed. When the upper cover is released, the pressing plate reset elastic sheet rebounds to open the upper cover and the lower cover and separate the pressing plate from the heating wire at the same time. When it is necessary to vacuumize, after sealing, the needle is positioned in the closed area surrounded by one sealing line with the adjacent first heating wires and the second heating wire. When the button is pressed, the button drives the lower cavity body to move downwardly, the lower cavity body drives the needle to move downwardly, and the upper cavity body and the lower cavity body punch the bag while pressing and sealing the bag. At the moment, the bag is also pressed by the pressing plate and the heating wire, the upper cavity body reset spring is compressed, and the pressing plate telescopic spring is compressed. After finishing vacuumizing, the power supply of the heating wire is switched on, and the opening is sealed at the original position. When the button is released, the upper cavity body reset spring rebounds to separate the upper cavity body from the lower cavity body. The pressing plate telescopic spring rebounds, and the bag is released by the pressing plate and the heating wire. The power supply of the heating wire is switched off, and when the upper cover is released, the pressing plate reset elastic sheet rebounds to open the upper cover and the lower cover and separate the pressing plate from the heating wire at the same time.

In Embodiment 2, the upper cover 11 is fixedly connected with the lower cover 12, and the upper cover is provided with a rotating plate 14 rotatably connected with the upper cover corresponding to a position above the upper cover bracket, and the button is slidably connected with the rotating plate up and down. The rotating plate is provided with a second button opening matched with the button, and the button is slidably arranged in the second button opening up and down. An outer wall of the button 26 is provided with a second button outer edge 262, the rotating plate is provided with a rotating plate button pressing block for pushing the button to move downwardly, and the upper cavity body reset spring is also the pressing plate reset member at the same time. In Embodiment 2, the first heating wires and the second heating wires form a sealed structure in a square shape. When the rotating plate is pressed, the rotating plate rotates downwardly, and the rotating plate button pressing block presses the second button outer edge to move downwardly, thus driving the pressing plate to move downwardly together. The pressing plate is contacted with the heating wire first, and the upper cavity body reset spring is compressed. At the moment, the power supply of the heating wire is switched on, so that the bag may be sealed. When the rotating plate is released, the upper cavity body reset spring rebounds, and the button drives the rotating plate to reset, thus driving the pressing plate to move upwardly and separate from the heating wire. When it is necessary to vacuumize, after sealing, the needle is positioned in the square-shaped area formed by the first heating wires and the second heating wires. When the button is pressed, the button drives the lower cavity body to move downwardly, the lower cavity body drives the needle to move downwardly, and the upper cavity body and the lower cavity body punch the bag while pressing and sealing the bag. At the moment, the bag is also pressed by the pressing plate and the heating wire, the upper cavity body reset spring is compressed, and the pressing plate telescopic spring is compressed. After finishing vacuumizing, the rotating plate is pressed, the power supply of the heating wire is switched on, and the opening is sealed at the original position. After sealing, the power supply of the heating wire is switched off, the button and the rotating plate are released, and the upper cavity body reset spring rebounds to separate the upper cavity body from the lower cavity body. Meanwhile, the button drives the rotating plate to rotate upwardly, and the pressing plate is separated from the heating wire.

In the embodiment, a bottom portion of a wall of the upper cavity body is provided with an upper sealing ring clamping groove, and an upper sealing ring 27 is clamped in the upper sealing ring clamping groove. A top portion of a wall of the lower cavity body is provided with an upper sealing ring clamping groove, and a lower sealing ring 28 matched and sealed with the upper sealing ring is arranged in the upper sealing ring clamping groove. When the upper cavity body and the lower cavity body are pressed, the upper sealing ring and the lower sealing ring are pressed to seal the upper cavity body and the lower cavity body.

In the embodiment, the upper cover bracket at a bottom portion of the button is provided with an elastic sheet 4 for switching on a power supply of the vacuum pump, and when the button is pressed, the elastic sheet is pressed by the button to switch on the power supply of the vacuum pump to start operation. That is, when the button is pressed, the upper cavity body and the lower cavity body are pressed and sealed, and the upper cavity body drives the needle in the upper cavity body to move downwardly to punch the bag. Meanwhile, the power supply of the vacuum pump is switched on to start vacuumization. When the button is released, the driving button of the upper cavity body reset spring moves upwardly, and the power supply of the vacuum pump is switched off.

In the embodiment, a wall of the lower cavity body is internally provided with a first air pumping hole 221 communicated with the lower cavity body, the lower cover 12 is provided with an air pumping connection hole 121 hermetically communicated with the first air pumping hole, and the air pumping connection hole is connected with the vacuum pump. When hermetically connected with the air pumping connection hole, the first air pumping hole is used for pumping air in the punched bag in the sealed cavity.

In the embodiment, the lower cavity body is detachably connected with the lower cover, and in the embodiment, the lower cavity body is detachably clamped with the lower cavity body through an elastic buckle. During specific implementation, the lower cavity body may also be detachably clamped with the lower cover in other ways. The lower cavity body has a symmetrical structure, the lower cavity body is capable of rotating by 180 degrees to be connected with the lower cover, a bottom portion of the lower cover is provided with an air pumping connector 5 corresponding to a position below the first cavity body, and the wall of the lower cavity body is internally provided with a second air pumping hole 222 communicated with the air pumping connector corresponding to the first air pumping hole. When the lower cavity body rotates by 180 degrees, the second air pumping hole is hermetically communicated with the air pumping connection hole. When the sealed bag is pumped, the second air pumping hole is hermetically connected with the air pumping connection hole, and an air pumping port sealing ring is connected with an air pumping port of the bag, so that the sealed bag is pumped.

In the embodiment, the bottom portion of the lower cover is provided with a sealing switch 34 for switching on the power supply of the heating wire. During specific implementation, a first sealing switch may be arranged at a convenient position on the upper cover or the lower cover according to an ergonomic principle. In the embodiment, the shell is internally provided with a battery compartment and a vacuum pump compartment, the battery compartment is internally provided with a power supply battery 6, and the vacuum pump is arranged in the vacuum pump compartment. In Embodiment 1, the battery compartment and the vacuum pump compartment are both arranged in the lower cover. The lower cover is provided with a battery cover 122, and the battery cover is clamped on the lower cover through a buckle. In Embodiment 2, the battery compartment and the vacuum pump compartment are both arranged in the lower cover. The upper cover and the lower cover are clamped, and the battery may be replaced by opening the upper cover. The battery is used for supplying power to the whole machine, and the vacuum pump is also arranged in the shell, thus being convenient to carry.

In the embodiment, the upper cover is provided with a cutting device 7, and the cutting device 7 comprises a cutter head 71 slidably clamped with the upper cover up and down. A tail portion of the cutter head is fixedly provided with a first inclined slider 71, the upper cover is provided with a toggle switch 73 for pushing the cutter head to extend downwardly, the toggle switch is provided with a second inclined slider 74 matched with the first inclined slider, and a cutter head reset spring 75 for driving the cutter head to retract and reset is arranged between the first inclined slider and the upper cover. The toggle switch is slidably arranged on the upper cover, and a top portion of the upper cover is provided with a toggle switch guide groove 111 for guiding the toggle switch. When the toggle switch is toggled horizontally, the toggle switch drives the second inclined slider to move, the second inclined slider pushes the first inclined slider to move downwardly, the cutter head extends out, and at the moment, the cutter head reset spring is compressed. When the toggle switch is toggled reversely, the cutter head reset spring rebounds, and the cutter head reset spring drives the cutter head to reset. The cutting device may be used for cutting the sealed bag.

The specific embodiments of the utility model are described in detail with reference to the drawings, which should not be understood as limiting the scope of protection of the utility model. Within the scope described in the claims, various modifications and variations may be made by those skilled in the art without creative works, which still belong to the scope of protection of the utility model.

The invention claimed is:

1. A multifunctional vacuum sealing machine, comprising a shell, a sealing device, and a vacuumizing device, wherein the sealing device comprises a hot welding device, and a pressing plate, wherein the pressing plate is arranged above the hot welding device, and the pressing plate is capable of being moved to contact the hot welding device for press welding, wherein the hot welding device further comprises a heating wire; wherein the sealing device is arranged in the shell, wherein the shell is provided with an opening for a bag to be inserted, wherein the vacuumizing device further comprises a lower cavity body arranged in the shell and an upper cavity body, the upper cavity body is movably arranged above the lower cavity body, wherein when the upper cavity body is moved in the opening and in contact with the lower cavity body, a sealed cavity is formed between the upper cavity body and the lower cavity body, wherein the sealed cavity is connected with a vacuum pump, wherein the heating wire is located in the lower cavity body, wherein the pressing plate is arranged in the upper cavity body, wherein the pressing plate is movably connected with the upper cavity body, wherein a pressing surface of the pressing plate is lower than a bottom surface of the upper cavity body; and wherein the shell is internally provided with an upper cavity body reset spring for separating the pressing plate from the heating wire, wherein the upper cavity body is internally and fixedly provided with a needle, and the needle is arranged above an area surrounded by the heating wire, wherein the shell further comprises an upper cover and a lower cover matched with the upper cover, wherein a wall of the lower cavity body is internally provided with a first air pumping hole communicated with the lower cavity body, wherein the lower cover is provided with an air pumping connection hole hermetically communicated with the first air pumping hole, and wherein the air pumping connection hole is connected with the vacuum pump; wherein the lower cavity body is detachably connected with the lower cover, wherein the lower cavity body is capable of being manually rotated by 180 degrees to be connected with the lower cover, wherein a bottom portion of the lower cover is provided with an air pumping connector arranged below the first cavity, wherein the wall of the lower cavity body is internally provided with a second air pumping hole communicated with the air pumping connector, the first air pumping hole and the second air pumping hole are bilaterally symmetrically arranged in the wall of the lower cavity body, and wherein when the lower cavity body rotates by 180 degrees, the second air pumping hole is hermetically communicated with the air pumping connection hole.

2. The multifunctional vacuum sealing machine according to claim 1, wherein the shell is internally provided with a battery compartment and a vacuum pump compartment, wherein the battery compartment is internally provided with a power supply battery, and wherein the vacuum pump is arranged in the vacuum pump compartment.

3. The multifunctional vacuum sealing machine according to claim 1, wherein the lower cavity body is arranged in the lower cover, wherein the upper cover is internally and fixedly provided with an upper cover bracket, wherein the upper cavity body is arranged in the upper cover bracket and vertically slidably connected with the upper cover bracket, wherein a button is arranged above the upper cover bracket, wherein the upper cavity body is fixedly connected with a sleeve communicated with the upper cavity body, wherein the button is fixedly connected with the sleeve, wherein the upper cavity body reset spring is located on the upper cover bracket and sheathed outside the sleeve, wherein a top end of the upper cavity body reset spring is fixedly connected with the button; and wherein the pressing plate and a pressing plate telescopic spring are located in the sleeve, wherein one end of the pressing plate telescopic spring is fixedly connected with the sleeve, and another end of the pressing plate telescopic spring is fixedly connected with the pressing plate.

4. The multifunctional vacuum sealing machine according to claim 3, wherein the upper cover is provided with a cutting device beside the upper cavity body, wherein the cutting device further comprises a cutter head slidably clamped with the upper cover, wherein a tail portion of the cutter head is fixedly provided with a first inclined slider, wherein the upper cover is provided with a toggle switch, wherein the toggle switch is provided with a second inclined slider matched with the first inclined slider, wherein a cutter head reset spring for driving the cutter head to retract and reset is arranged between the first inclined slider and the upper cover; wherein the toggle switch is slidably arranged on the upper cover, and wherein a top portion of the upper cover is provided with a toggle switch guide groove for guiding the toggle switch, wherein when the toggle switch is toggled horizontally, the toggle switch drives the second inclined slider to move until the second inclined slider is released from contact with the first inclined slider, and a lower surface of the toggle switch is contacted with an upper surface of the cutter head to push the cutter head to extend downwards into the opening; and wherein when the toggle switch is toggled reversely, the toggle switch drives the second inclined slider to move until the second inclined slider is contacted with the first inclined slider, and a lower surface of the toggle switch is released from contact with an upper surface of the cutter head, and the cutter head reset spring rebounds and drives the cutter head to reset upward into the upper cover.

5. The multifunctional vacuum sealing machine according to claim 3, wherein the upper cover bracket at a bottom portion of the button is provided with an elastic sheet for switching on a power supply of the vacuum pump, wherein when the button is pressed, the power supply of the vacuum pump is switched on to start operation.

6. The multifunctional vacuum sealing machine according to claim 3, wherein the upper cover is rotatably connected with the lower cover, wherein the button is slidably connected with the upper cover, wherein an outer wall of the button is provided with a first button outer edge, wherein the upper cover is provided with an upper cover button pressing block for pushing the button to move downwardly; and further comprising a pressing plate reset member for separating the pressing plate from the heating wire, wherein the pressing plate reset member is a pressing plate reset elastic sheet arranged between the upper cover and the lower cover.

7. The multifunctional vacuum sealing machine according to claim 3, wherein the upper cover is fixedly connected with the lower cover, wherein the upper cover is provided with a rotating plate rotatably connected with the upper cover, the rotating plate is arranged above the upper cover bracket, wherein the button is slidably connected with the rotating plate, wherein an outer wall of the button is provided with a second button outer edge, wherein the rotating plate is provided with a rotating plate button pressing block for pushing the button to move downwardly.

8. The multifunctional vacuum sealing machine according to claim 1, wherein the heating wire further comprises at least two first heating wires arranged in parallel and at least one second heating wire connected with the first heating wires.

* * * * *